Sahlström & Rohdin.
Egg-Detector.

No. 116501

PATENTED JUN 27 1871

Attest
A. Ruppert
M. Hathaway

August Sahlström &
Peter Rohdin
Inventors
per
C. F. Clausen
their Atty.

116,501

UNITED STATES PATENT OFFICE.

AUGUST SAHLSTROM AND PETER ROHDIN, OF CHICAGO, ILLINOIS.

IMPROVEMENT IN EGG-DETECTERS.

Specification forming part of Letters Patent No. 116,501, dated June 27, 1871.

*To all whom it may concern:*

Be it known that we, AUGUST SAHLSTROM and PETER ROHDIN, both of Chicago, in the county of Cook and in the State of Illinois, have invented a new and useful Improvement in Egg-Detecters; and we do hereby declare the following to be a full, clear, and exact description of the same, reference being had to the accompanying drawing making a part of this specification, in which—

Figure 1:
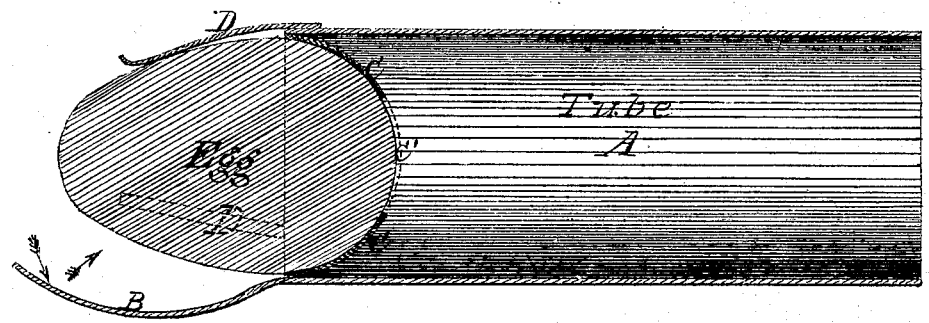
Figure 2:
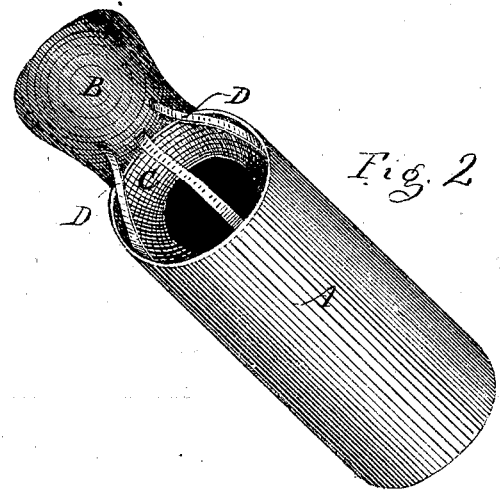

Figure 1 is a central sectional view, showing an egg inserted in the apparatus; and Fig. 2 represents a perspective view of the apparatus.

Similar letters of reference denote identical parts.

The nature of our invention consists in a hollow cylindrical tube, which is open at both ends, resembling the casing of a telescope. At one end the cylinder is provided with a reflector and three or more springs, which serve to keep the egg which is to be examined in its proper place.

A is a hollow cylinder made of zinc, tin, or any other suitable material, and open at both ends. At one end the tube is provided with a plate, B, which may either be adjusted or permanently attached to the cylinder and about parallel with the same, extending about one-third of its circumference. This plate projects about two or three inches; its outer corners are rounded, and the plate slightly curved, with its convex side toward the center. Three or more springs, D, are attached to the cylinder at the same end as the reflector B, and so arranged that they incline toward each other and are placed opposite or nearly opposite each other, that they may fit over and hold the egg which is to be examined. In order to prevent the egg from sliding into the cylinder a base, C, is provided, against which the egg to be examined rests. This base is formed by means of a semi-spherical or nearly semi-spherical plate, C, which is secured to the end and at the inner side of the cylinder A. Said plate is at its center provided with a circular aperture, C', about one inch in diameter, through which the operator ascertains the translucency of the egg resting on it.

The egg to be examined is inserted between the springs D, one end resting against the plate or base C. The operator holds that end of the cylinder in which the egg is placed toward the light, with reflector downward, and looks through the other end of the cylinder. The reflector aiding in transmitting more rays of light to the egg, the operator will at a glance be enabled to detect if the egg is fresh or not. The tube A might also be constructed in such a manner that several eggs may be examined at once, or several tubes may be attached to each other.

Having thus described our invention, what we claim, and desire to secure by Letters Patent, is—

The combination of the tube A, reflector B, plate C, and springs D, substantially as and for the purpose set forth.

In testimony whereof we have signed our names to this specification in the presence of two subscribing witnesses.

AUGUST SAHLSTROM.
PETER ROHDIN.

Witnesses:
JOHN F. AKERSTEIN,
CHARLES CULMSEE.